United States Patent
Kondo (10) Patent No.: US 7,400,233 B2
(45) Date of Patent: Jul. 15, 2008

(54) TRAVEL SAFETY APPARATUS FOR VEHICLE

(75) Inventor: Shugo Kondo, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 11/442,452

(22) Filed: May 26, 2006

(65) Prior Publication Data

US 2006/0267747 A1 Nov. 30, 2006

(30) Foreign Application Priority Data

May 30, 2005 (JP) ............................. 2005-157130

(51) Int. Cl.
*B60Q 1/00* (2006.01)
*G08G 1/095* (2006.01)
*G09G 5/00* (2006.01)

(52) U.S. Cl. ............................. 340/435; 340/908; 345/7

(58) Field of Classification Search ......... 340/435–437, 340/980; 701/300–302; 348/7–9; 359/609, 359/843, 13, 14

See application file for complete search history.

(56) References Cited

U.S. PATENT DOCUMENTS

| 6,348,877 | B1 * | 2/2002 | Berstis et al. ............... 340/980 |
| 6,693,524 | B1 * | 2/2004 | Payne .......................... 340/463 |
| 7,222,009 | B2 * | 5/2007 | Hijikata et al. ................. 701/41 |
| 2003/0169213 | A1 * | 9/2003 | Spero ............................. 345/7 |
| 2004/0150514 | A1 * | 8/2004 | Newman et al. ............. 340/435 |
| 2005/0159893 | A1 * | 7/2005 | Isaji et al. .................... 701/301 |
| 2006/0098093 | A1 * | 5/2006 | Hahn et al. .................. 348/148 |

FOREIGN PATENT DOCUMENTS

JP 2799375 4/1995

* cited by examiner

*Primary Examiner*—George A Bugg
*Assistant Examiner*—Jennifer Mehmood
(74) *Attorney, Agent, or Firm*—O'Melveny & Myers LLP (57) ABSTRACT

A travel safety apparatus for a vehicle which includes an object detecting unit which detects an object in a traveling direction of the vehicle; an object information obtaining unit adapted to obtain object information; a vehicle information obtaining unit adapted to obtain vehicle information; a determination unit which determines whether or not there is a possibility of a contact or a collision; a position detecting unit which detects positions of eyeballs of an occupant of the vehicle; a projecting unit adapted to project an image on the occupant's retina when there is a possibility of a contact or a collision; and a controller which controls the projecting unit, wherein the controller is adapted to control the projecting unit to project the predetermined image so that the image overlaps in the occupant's view with a position of the object or an area within a predetermined radius from the position of the object.

8 Claims, 6 Drawing Sheets

ACCELERATION/HIGH SPEED

FIG. 7B

DECELERATION/LOW SPEED

TRAVEL SAFETY APPARATUS FOR VEHICLE

BACKGROUND OF THE INVENTION

1. Field of the Invention

The present invention relates to a travel safety apparatus for a vehicle.

Priority is claimed on Japanese Patent Application No. 2005-157130, filed May 30, 2005, the content of which is incorporated herein by reference.

2. Description of Related Art

There is conventionally known an anti-collision system for a vehicle which detects an obstruction in the vicinity of the vehicle using an object detecting unit such as a radar or a camera. The anti-collision system computes an estimated traveling path of the obstruction based on its path of movement and an estimated traveling path of the vehicle based on its traveling path, determines whether or not there is a possibility of a collision of the vehicle with the obstruction, and outputs an alarm or controls traveling of the vehicle based on the determination result (see, for example, Japanese Patent No. 2799375).

In the aforementioned anti-collision system, a method is known of displaying alarm images in a display of a navigation device or in a heads-up display which is disposed at a predetermined position on a windshield of the vehicle and capable of displaying detecting results of the object detecting unit. The method is used when an alarm indicating that the vehicle has a possibility of colliding with the obstruction is output to an occupant of the vehicle. However, in this method, when sunlight reflects on the display or the heads-up display, the sunlight reduces the occupant's ability to see the image on the display.

SUMMARY OF THE INVENTION

The present invention is made in view of the aforementioned circumstances, and it has as an object to provide a travel safety device for a vehicle which can prevent reduction of an occupant's ability to realize that there is an object which obstructs the traveling of the vehicle.

A first aspect of the present invention is a travel safety apparatus for a vehicle, including an object detecting unit which detects an object in a traveling direction of the vehicle; an object information obtaining unit adapted to obtain object information regarding the object; a vehicle information obtaining unit adapted to obtain vehicle information regarding the vehicle; a determination unit which determines whether or not there is a possibility that any one of a contact and a collision between the vehicle and the object occurs based on the object information and the vehicle information; a position detecting unit which detects positions of eyeballs of an occupant of the vehicle; a projecting unit adapted to project a predetermined image on a retina of the occupant based on a determination result of the position detecting unit when the determination unit determines that there is a possibility that any one of a contact and a collision between the vehicle and the object occurs; and a controller which controls operation of the projecting unit; wherein the controller is adapted to control the projecting unit to project the predetermined image so that the predetermined image overlaps in a view of the occupant with any one of a position of the object and a area within a predetermined radius from the position of the object.

The travel safety apparatus of the present invention can project the predetermined image on the occupant's retina using the projecting unit so that the image overlaps in the occupant's view with an object which the vehicle has a possibility of contacting or colliding with. Therefore, the occupant can view the image easily when the occupant's ability to view displays provided in the vehicle changes in accordance with the luminance of the surroundings and properly recognize the object.

The controller may be adapted to control the projecting unit so that the predetermined image blinks. In this case, the occupant can view the image more easily and can recognize the object.

The determination unit may be adapted to determine a movement direction of the object, and the predetermined image may be an image which shows the movement direction.

The determination unit may be adapted to determine a velocity of the object, and the controller may be adapted to control the projecting unit to change a size of the predetermined image in accordance with the velocity of the object.

In this case, the occupant can not only recognize the object with which the vehicle has a possibility of contacting or colliding with, but also know the moving state of the object. Therefore, it contributes to improvement of the safety of the vehicle in traveling.

DETAILED DESCRIPTION OF THE INVENTION

Figure 1:
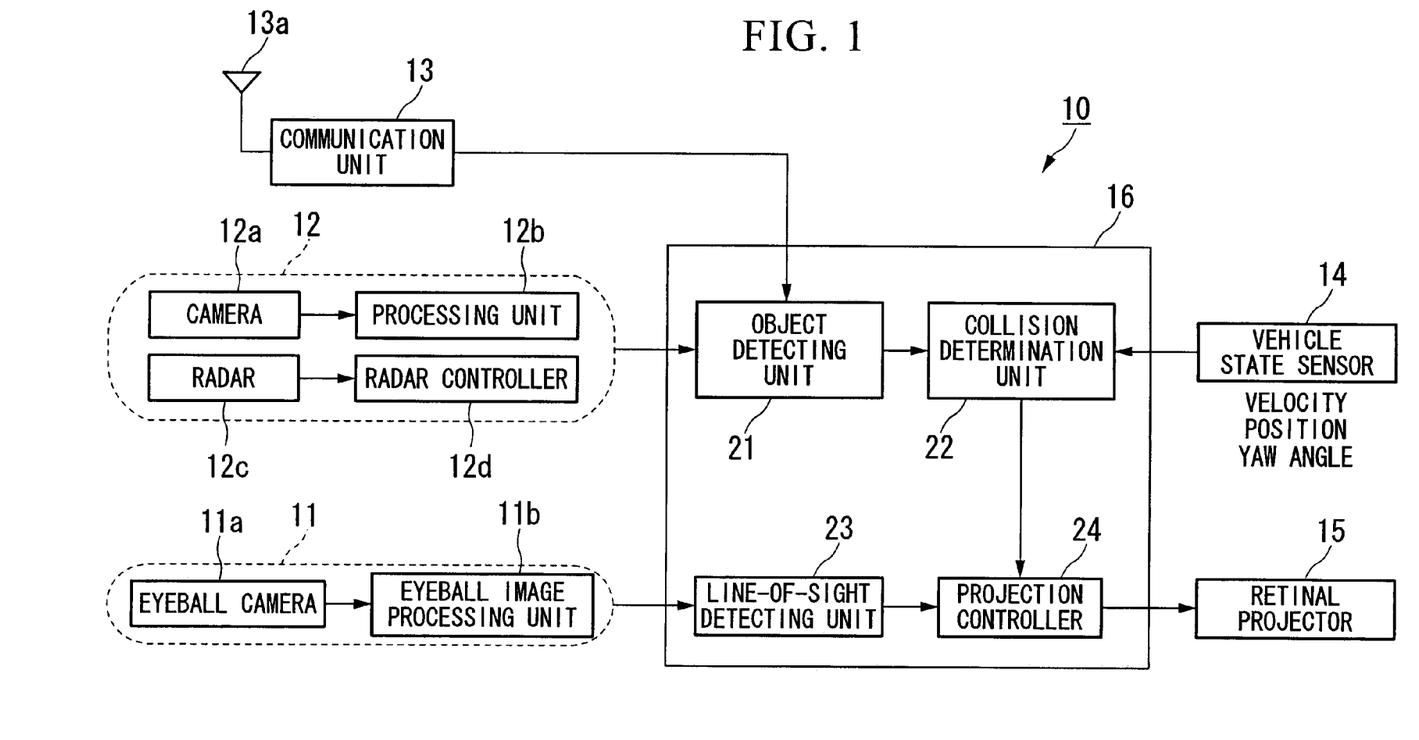
FIG. 1 is a diagram showing a constitution of a travel safety apparatus for a vehicle of an embodiment of the present invention.

Hereinbelow, a travel safety apparatus for a vehicle of an embodiment of the present invention is described with reference to the accompanying drawings. As shown in FIG. 1, a travel safety apparatus 10 of the present embodiment has an eyeball sensor 11, an external sensor 12, a communication unit 13, a vehicle state sensor 14, a retinal projector 15, and an electrical control unit (ECU) 16.

The eyeball sensor 11 is composed of an eyeball camera 11a such as a CCD camera or a CMOS camera capable of performing imaging in the visible-light region and infrared region and an eyeball image processing unit 11b. The eyeball sensor 11 is disposed in a position aligned with a rearview mirror in the horizontal direction and nearer the driver than the rearview mirror. The eyeball sensor 11 is disposed so as to obtain images of the driver's eyeballs.

The camera 11a captures visible light reflected from a face and eyeballs of the driver, or infrared rays reflected by the eyeballs of the driver. In the case of infrared rays being used, they are emitted from an appropriate infrared projector (not illustrated) provided in the vehicle.

The processing unit 11b generates image data consisting of two-dimensionally arranged pixels by performing predetermined processing such as filtering and binarization on the images obtained by the camera 11a and sends the image data to the ECU 16.

The external sensor 12 is composed of a camera 12a such as a CCD camera or a CMOS camera, a processing unit 12b, a laser-light or millimeter-wave radar 12c, and a radar controller 12d.

The camera 12a is disposed in the cabin, near the rearview mirror, and by the windshield. The camera 12a images an area of a predetermined range ahead of the vehicle through the windshield.

The processing unit 12b generates image data consisting of two-dimensionally arranged pixels by performing predetermined processing such as filtering and binarization on the images obtained by the camera 12a and sends the image data to the ECU 16.

The radar 12c is disposed at a nose-portion of the vehicle or at a position in the cabin, near the windshield. The radar 12c is controlled by the radar controller 12d in accordance with a command from the ECU 16 and emits laser-light or a millimeter-wave transmission signal from the radar in an appropriate detection direction (for example, forward in the direction the vehicle is traveling). Then the radar 12c receives a reflected signal produced by the transmission signal being reflected by an object external to the vehicle, generates a beat signal by mixing the reflected signal and the transmission signal, and outputs the beat signal to the ECU 16.

The communication unit 13 has an antenna 13a disposed on the roof of the vehicle and exchanges information with a communication device provided in another vehicle. The information sent from the other vehicle includes information about the state of the other vehicle such as velocity, position, yaw angle (angle of rotation of the vehicle's center of gravity about the vertical axis), steering angle (amount of steering by the driver), and ON/OFF states of the direction indicators and brakes.

The vehicle state sensor 14 has a constitution provided with a velocity sensor that measures the velocity (vehicle velocity) of the vehicle; a position sensor that determines the present position and travel direction of travel of the vehicle based on a positioning signal such as a global positioning system signal that determines the position of a vehicle using a satellite and a position signal transmitted from an information transmitter on the exterior of the vehicle, and moreover the detection result of an appropriate gyro sensor and acceleration sensor; sensors that detect the yaw angle, yaw rate (angular velocity of rotation of the vehicle's center of gravity about the vertical axis), and the steering angle, and sensors for detecting the ON/OFF states of the direction indicators and brakes.

The retinal projector 15 is controlled by the ECU 16 based on the image data sent from the eyeball sensor 11, and projects a predetermined alarm image on the retina of the driver.

The electrical control unit (ECU) 16 has an object detecting unit 21, a collision determination unit 22, a line-of-sight detecting unit 23, and a projection controller 24.

The object detecting unit 21 determines a traveling path of the other vehicle based on information about the other vehicle status obtained with the communication unit 13 and information about the position of the other vehicle detected by the external sensor 12.

The object detecting unit 21 also computes a distance between the vehicle and the other vehicle/object in a predetermined detection area based on the frequency F of the beat signal (the beat frequency) input from the external sensor 12 and the movement conditions (for example, velocity and direction of movement) of the other vehicle/object based on the change over time of the position of the other vehicle/object.

Furthermore, the object detecting unit 21 detects positions of another vehicle or an object outside the vehicle based on the image data input from the external sensor 12 and computes the movement condition (for example, velocity and direction of movement) of the other vehicle/object based on the change over time of the positions of the other vehicle/object.

The collision determination unit 22 determines the traveling path of the vehicle based on detection signals indicating the state of the vehicle, such as the steering angle measured by the steering angle sensor, the yaw rate measured by the gyro sensor, and the vehicle velocity measured by the vehicle velocity sensor, which are output from the vehicle state sensor 14.

Then the collision determination unit 22 determines a degree of risk, such as a possibility that the vehicle will contact or collide with the other vehicle/object obstructing the traveling of the vehicle. The collision determination unit 22 outputs the determination results to the projection controller 24.

The line-of-sight detecting unit 23 performs a predetermined process of recognition using the image data from the eyeball sensor 11, setting the face and eyeballs of the driver as subjects to be recognized, and detects the positions of the driver's eyeballs, the vector of the driver's line of sight (a direction of the line of sight), and a position to which the line of sight is directed.

The projection controller 24 controls the retinal projector 15 to project a predetermined alarm image on the driver's retina when the driver of the vehicle watches the other vehicle/object determined to have a possibility of contacting or colliding with the vehicle by the collision determination unit 22 based on the degree of risk, positions of the driver's eyeballs, vector of the driver's line of sight, and position to which the line of sight is directed. At this time, the projection controller controls the retinal projector 15 to project the alarm image so that the alarm image overlaps with a part of the other vehicle/object or with an area within a predetermined radius from the position of the other vehicle/object.

Figure 3:
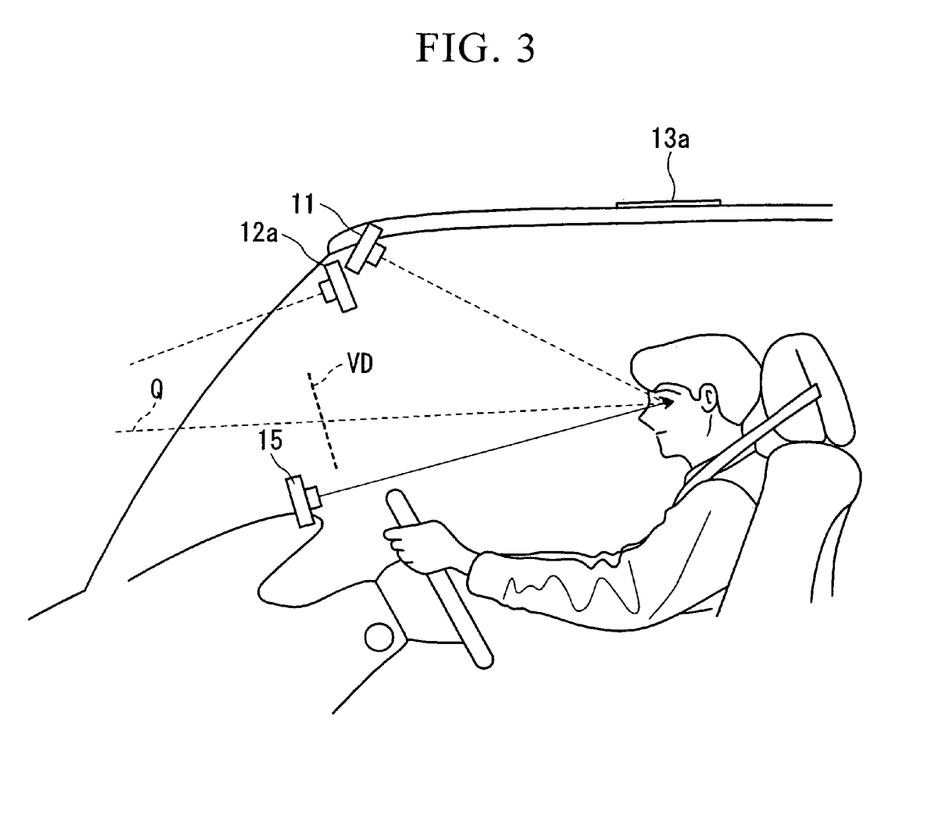
FIG. 3 is a diagram showing an example of positioning of an eyeball sensor, a camera for an outside sensor, and a retinal projection device of the travel safety apparatus of the present embodiment.
Figure 4:
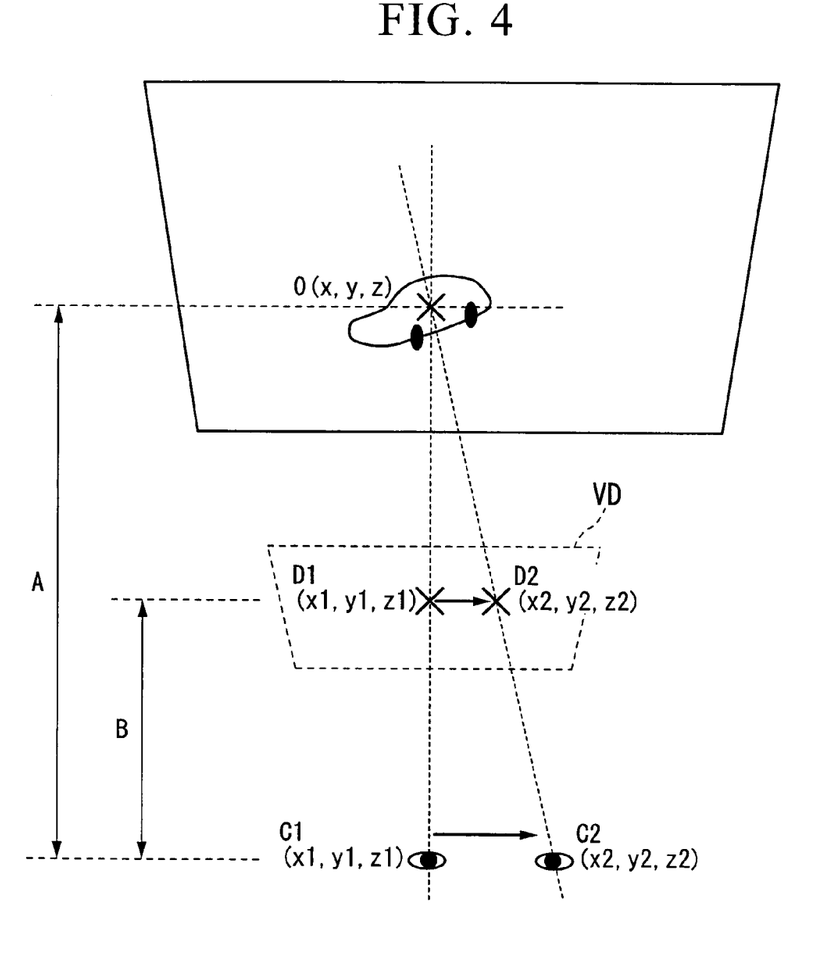
FIG. 4 is a diagram showing an example of a state where a position-change of a driver's eyeball is used to determine a position-change for displaying an alarm image on a predetermined virtual display.
Figure 5:
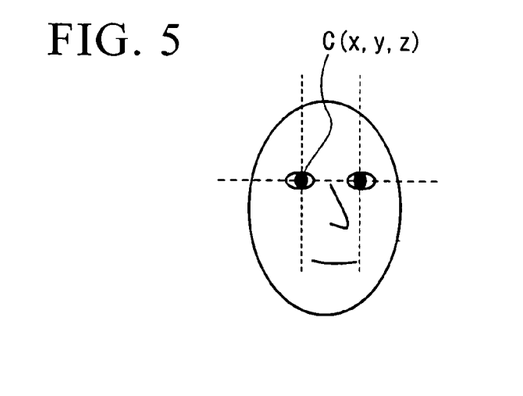
FIG. 5 is a diagram showing an example of positions of a driver's eyeballs.

As shown in FIGS. 3 and 4, when setting a position on the driver's retina where the alarm image is to be projected, the projection controller 24 sets the position so that the alarm image appears to the driver to be on a predetermined virtual display VD set on the driver's line of sight Q when the alarm image is projected. As shown in FIG. 5, the projection controller 24 sets the position of the driver's dominant eye (e.g., right eye) as an eyeball position C. As shown in FIG. 4, when the eyeball position C changes (such as if the position C1 changes into a position C2) the projection controller 24 converts the amount of change of the position C (i.e., C2-C1) into an amount of change of the coordinates of the alarm image on the virtual display VD (i.e., D2-D1) which is set at an appropriate distance B from the position C and controls the retinal projector 15 so that the alarm image overlaps in the view of the driver with the position O to which the driver's line of sight is directed at an appropriate distance A (e.g., A>B) from the eyeball position C or with an area within a predetermined radius from the position O.

The position O may be the position of the other vehicle/object in the view of the driver, and may also be the position of the image of the other vehicle/object on a display on which a detection result of the external sensor 12 is displayed.

The driver registers his dominant eye in the travel safety apparatus 10 in advance. The registration may be performed by predetermined operation of the apparatus, for example, pressing a switch for switching ON/OFF of the apparatus for a certain period of time.

The travel safety apparatus for a vehicle 10 of the present embodiment has the aforementioned constitution and the operation thereof is described below.

Figure 6:
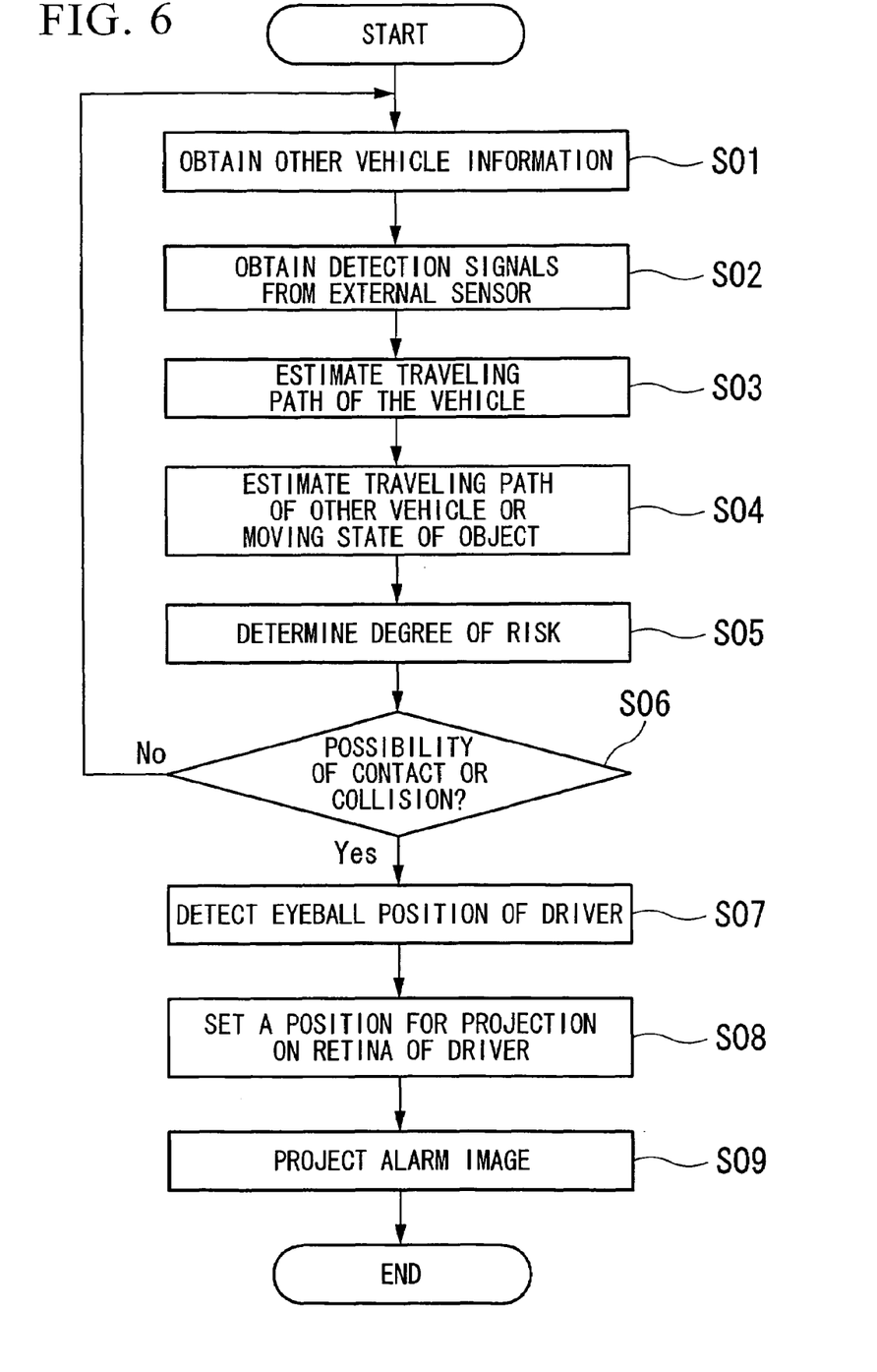
FIG. 6 is a flowchart showing operation of the travel safety apparatus of the present embodiment.

In step S01 shown in FIG. 6, the object detecting unit 21 obtains information about the state of the other vehicle such as velocity, position, yaw angle, steering angle, and ON/OFF states of the direction indicators and brakes through vehicle-to-vehicle communication with the communication unit 13.

In step S02, the ECU 16 obtains detection signals from the external sensor 12 such as image data taken by the camera 12a and the beat signal generated by the radar 12c.

In step S03, the collision determination unit 22 computes an estimated traveling area having a width of the vehicle based on detection signals showing the state of the vehicle such as the steering angle, yaw rate, and vehicle velocity which are output from the vehicle state sensor 14 by widening the estimated traveling path of the vehicle (for example, a line of the estimated traveling path of the vehicle's center of the gravity) by the width of the vehicle, setting the estimated traveling path as the center.

In step S04, the object detecting unit 21 estimates a traveling path of the other vehicle based on the information about the other vehicle status, or the position and the movement condition (for example, velocity and direction of movement) of the object based on the detection signal input from the external sensor 12.

In step S05, the collision determination unit 22 determines a degree of risk such as a possibility of contact or collision between the vehicle and the other vehicle/object based on the traveling path of the vehicle, and that of the other vehicle or the position and movement conditions of the object.

In step S06, the collision determination unit 22 determines whether or not there is a possibility of contact or collision between the vehicle and the other vehicle/object.

If the determination result is "NO", the processing returns to the aforementioned step S01.

If the determination result is "YES", the processing proceeds to step S07.

In step S07, the line-of-sight detecting unit 23 detects the positions of the driver's eyeballs, the vector of the driver's line of sight, and a position to which the line of sight is directed based on the image data form the eyeball sensor 11.

In step S08, the projection controller 24 sets a position on the driver's retina where the alarm image is to be projected (the projecting position), so that the alarm image is virtually positioned on the predetermined virtual display VD set on the driver's line of sight Q, and so that the alarm image overlaps in the virtual display VD with a part of the other vehicle/object or with an area within a predetermined radius from the position of the other vehicle/object when the alarm image is projected.

Figure 2:
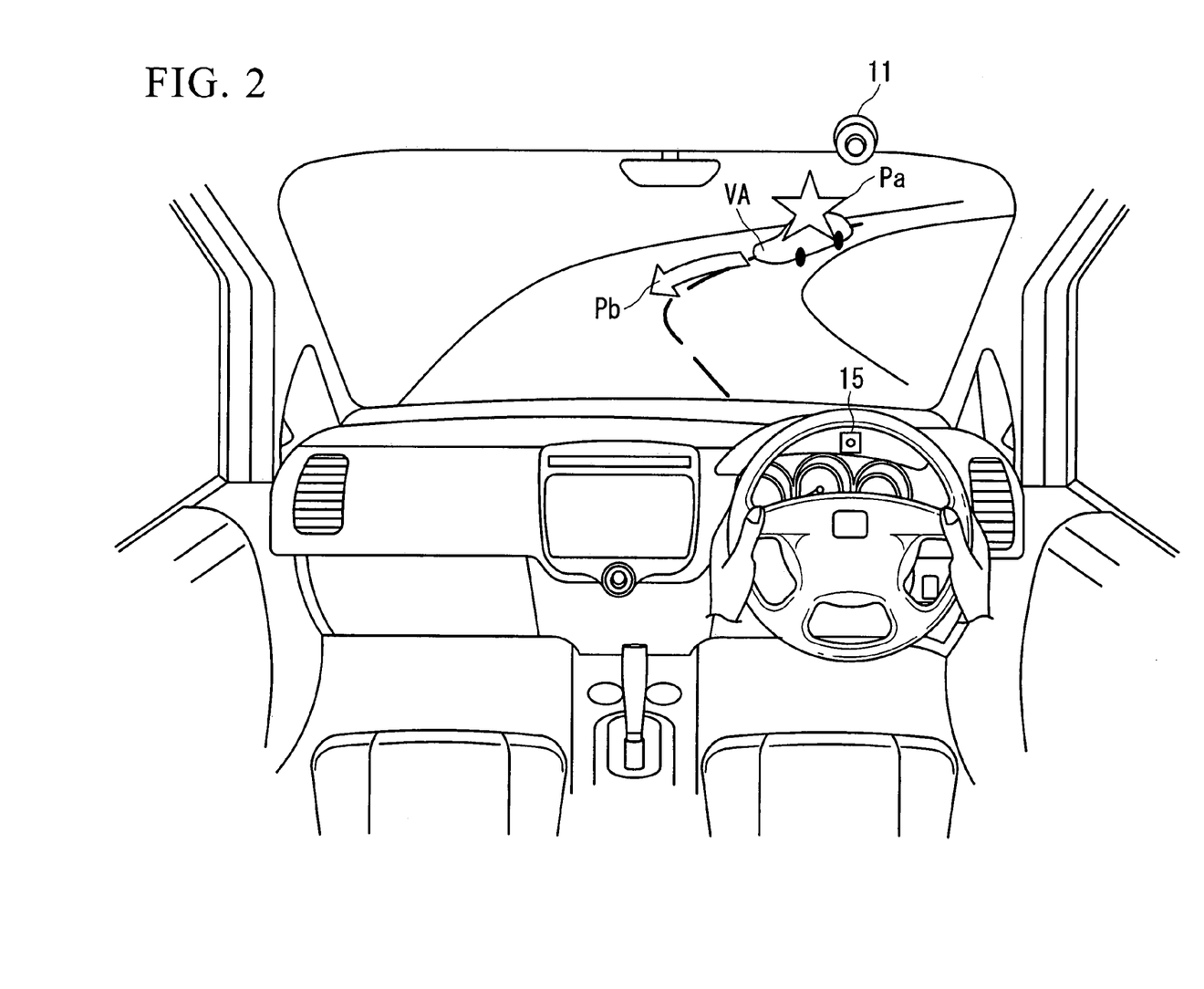
FIG. 2 is a diagram showing a cabin of a vehicle in which the travel safety apparatus of the present embodiment is provided viewed from the rear.

In step S09, the projection controller 24 controls the retinal projector 15 to project alarm images, for example, a star-shaped image Pa which indicates the presence of the other vehicle VA to the driver by blinking and an arrow image Pb which indicates the moving direction and velocity of the other vehicle VA to the driver, on the driver's retina as shown in FIG. 2. The images Pa and Pb are projected so as to overlap in the driver's view with a part of the other vehicle VA or with an area within a predetermined radius from the position of the other vehicle VA, and the processing is terminated.

Figure 7A:
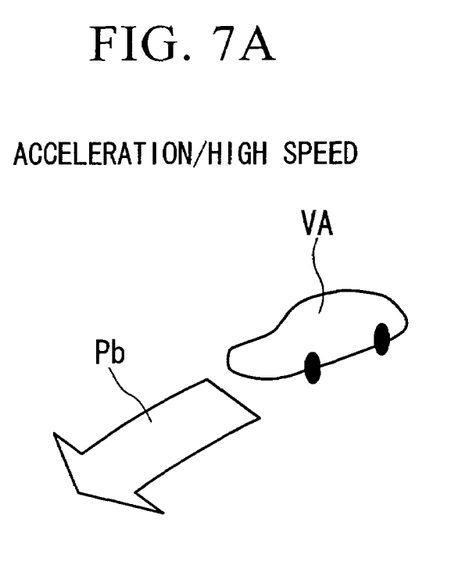
FIGS. 7A and 7B are diagrams showing examples of an image of an arrow which changes in accordance with moving direction and velocity of the other vehicle.
Figure 7B:
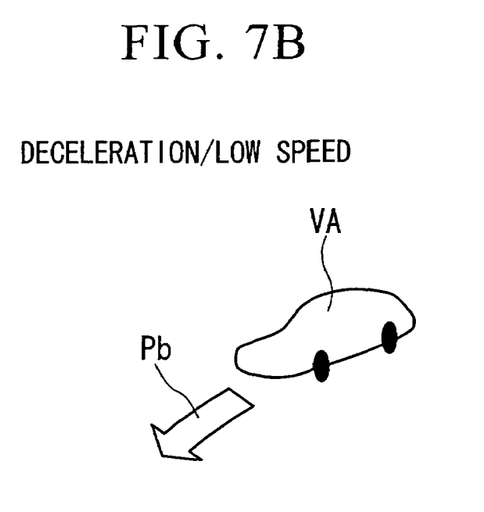

The arrow image Pb is set to become longer and larger when the other vehicle VA is accelerating or traveling at a high speed as shown in FIG. 7A, and to become shorter and smaller when the other vehicle VA is decelerating or traveling at a low speed as shown in FIG. 7B.

The travel safety apparatus 10 of the present embodiment can project the predetermined alarm image on the driver's retina using the retinal projector 15 so that the alarm image overlaps with an object which has a possibility of contacting or colliding with the vehicle, as described. The driver therefore can see the alarm image easily when the ability of the driver to view the surroundings changes in accordance with the brightness of the surroundings and properly recognize the object which has a possibility of contacting or colliding with the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A travel safety apparatus for a vehicle, comprising:
   an object detecting unit which detects an object in a traveling direction of the vehicle;
   an object information obtaining unit adapted to obtain object information regarding the object;
   a vehicle information obtaining unit adapted to obtain vehicle information regarding the vehicle;
   a determination unit which determines whether or not there is a possibility that one of contact and collision between the vehicle and the object occurs based on the object information and the vehicle information;
   a position detecting unit which detects positions of eyeballs of an occupant of the vehicle;
   a projecting unit adapted to project a predetermined image on a retina of the occupant based on eyeball position information when the determination unit determines that there is a possibility that one of contact and collision between the vehicle and the object occurs; and
   a controller which controls operation of the projecting unit, wherein the controller is adapted to control the projecting unit to project the predetermined image so that the predetermined image overlaps in a view of the occupant with one of a position of the object and an area within a predetermined radius from the position of the object.

2. The travel safety apparatus according to claim 1, wherein the controller is adapted to control the projecting unit so that the predetermined image blinks.

3. The travel safety apparatus according to claim 1, wherein the determination unit is adapted to determine a movement direction of the object, and
   wherein the predetermined image is an image which shows the movement direction.

4. The travel safety apparatus according to claim 1, wherein the determination unit is adapted to determine a velocity of the object, and
   wherein the controller is adapted to control the projecting unit to change a size of the predetermined image in accordance with the velocity of the object.

5. The travel safety apparatus according to claim 2, wherein the determination unit is adapted to determine a movement direction of the object, and
   wherein the predetermined image is an image which shows the movement direction.

6. The travel safety apparatus according to claim 2,
wherein the determination unit is adapted to determine a velocity of the object, and
wherein the controller is adapted to control the projecting unit to change a size of the predetermined image in accordance with the velocity of the object.

7. The travel safety apparatus according to claim 3,
wherein the determination unit is adapted to determine a velocity of the object, and
wherein the controller is adapted to control the projecting unit to change a size of the predetermined image in accordance with the velocity of the object.

8. The travel safety apparatus according to claim 5,
wherein the determination unit is adapted to determine a velocity of the object, and
wherein the controller is adapted to control the projecting unit to change a size of the predetermined image in accordance with the velocity of the object.

* * * * *